(No Model.) 2 Sheets—Sheet 1.

C. A. HUSSEY.
BICYCLE TIRE.

No. 571,444. Patented Nov. 17, 1896.

WITNESSES:
W. H. Pumphrey.
J. Green

INVENTOR,
CHARLES A. HUSSEY,
BY
HIS ATTORNEYS.

(No Model.) 2 Sheets—Sheet 2.
C. A. HUSSEY.
BICYCLE TIRE.
No. 571,444. Patented Nov. 17, 1896.
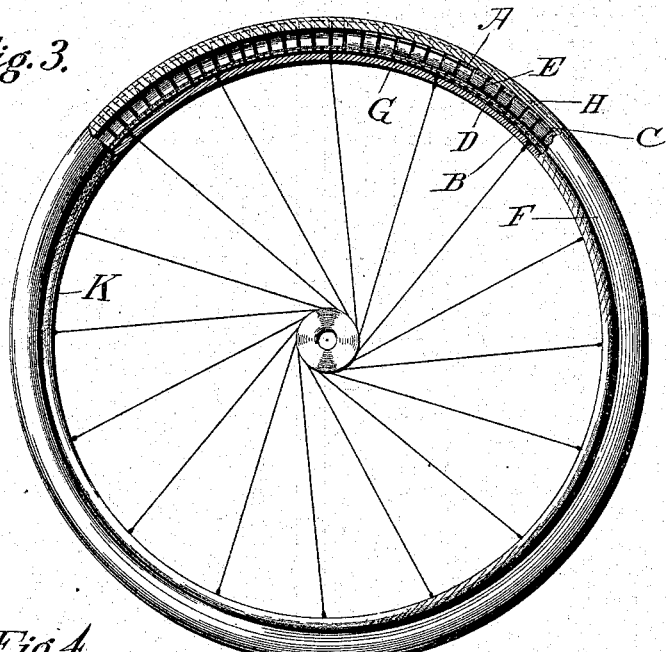
Fig. 3.
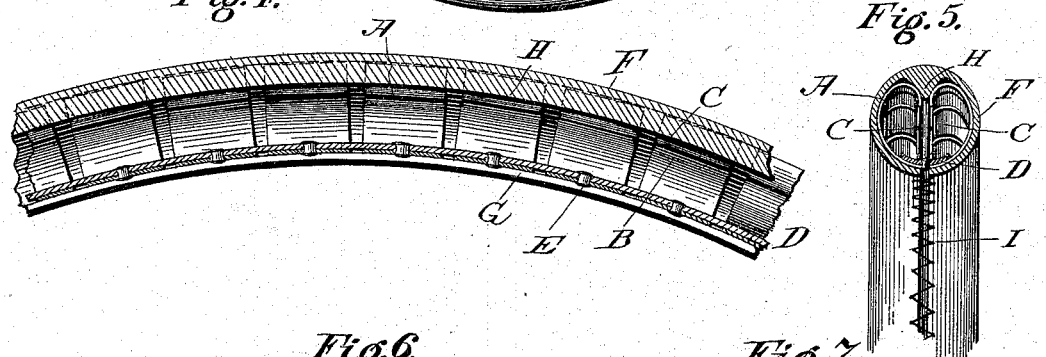
Fig. 4.
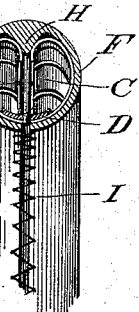
Fig. 5.
Fig. 6.
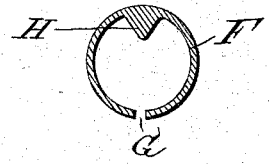
Fig. 7.
WITNESSES:
W. H. Pumphrey.
J. Green.
INVENTOR,
CHARLES A. HUSSEY,
BY
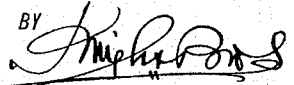
HIS ATTORNEYS.

UNITED STATES PATENT OFFICE.

CHARLES A. HUSSEY, OF NEW YORK, N. Y.

BICYCLE-TIRE.

SPECIFICATION forming part of Letters Patent No. 571,444, dated November 17, 1896.

Application filed April 9, 1896. Serial No. 586,802. (No model.)

*To all whom it may concern:*

Be it known that I, CHARLES A. HUSSEY, a citizen of the United States, residing at New York, county and State of New York, have invented certain new and useful Improvements in Bicycle-Tires, of which the following is a specification.

The primary principle of this invention relates to a hollow tire more particularly adapted for bicycles in which the feature of compressed air is eliminated and the same desirable results obtained by other means, as will be explained.

Figure 1:
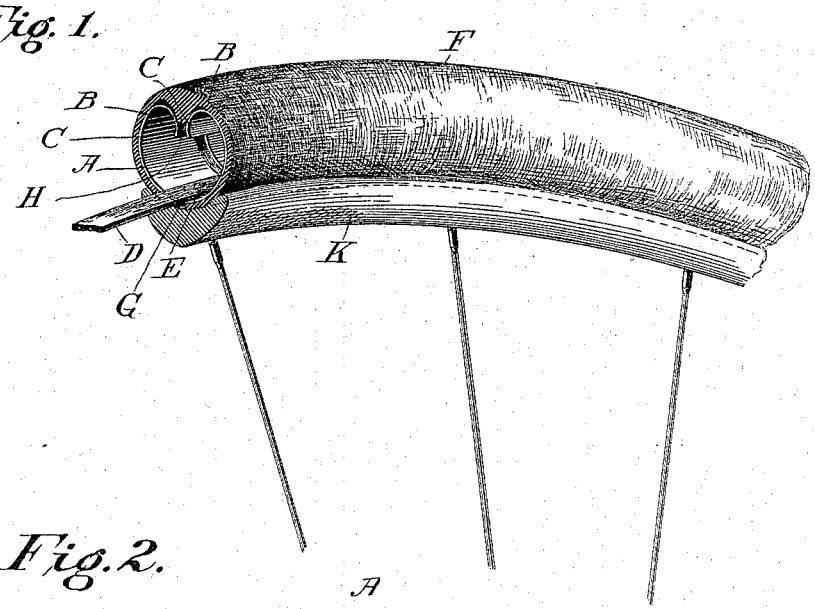
Figure 2:
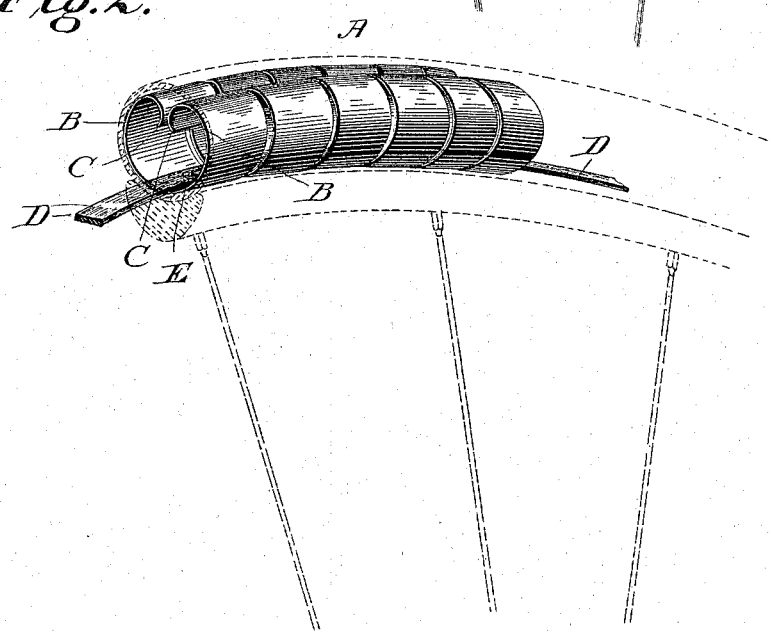

Referring to the accompanying drawings, which form a part of this specification, Figure 1 is a perspective view of a portion of my improved tire, showing the parts assembled and in position on the rim of a bicycle. Fig. 2 is a similar view with the outer envelop of the tire removed to disclose the interior parts. Fig. 3 represents a side elevation of a wheel made in conformity with my present invention, a part of the exterior surface of said wheel being broken away in order to disclose the interior working parts. Fig. 4 is a fragmentary or detail view of the interior skeleton, said detail being in longitudinal section. Fig. 5 is a cross-section of the parts assembled, showing also the manner of securing the parts together. Fig. 6 is a cross-section of the skeleton separate. Fig. 7 is a cross-section of the exterior envelop, also separate.

In the drawings, A represents a series of formers or supporters formed of spring-steel, said steel being about ten one-thousandths of an inch in thickness to give the best result and being constructed in the shape shown in the drawings, the parts B B curving inwardly and terminating in points C C, exposing thereby a V-shaped opening or inset facing the tread or periphery of the wheel. These formers or supporters are about one inch in width and are secured one to the other in continuous circular series by means of a rubber or other elastic band or strap D, fastened by means of rivets E or otherwise. They are located about one-eighth of an inch apart and so arranged as that when in operation one will not encroach upon the territory of its neighbor.

The object of the rubber band is to hold the formers at a given distance apart and prevent them crowding together, and also to permit the tire to expand over the rim, and by its tension to assist in holding the tire around the rim.

I also provide an envelop or hollow tire F, made, preferably, of rubber, and having a continuous opening at G, so as to permit the parts being easily assembled.

At H, I provide a wedge, cone, or V-shaped extension upon the interior of the tire formed, preferably, of rubber integrally with the tire and perfectly solid.

For securing the rubber tire around the spring-steel skeleton I employ a cord I, which is laced in and out, drawing the edges of the tire toward each other and holding them in a central position, as shown in Fig. 5.

When the parts of the tire are assembled, they are placed over the rim J, as shown in Figs. 1, 2, and 3.

It will also be seen from Figs. 1 and 5 that the wedge-shaped extension H fits into the complementary opening formed by the insetting ends of the supporters or formers A, the result being that the thick portion of the envelop is constantly kept at the central and most-used portion of the tread, so that tendency to puncture at this point will be offset by the resistance which the thickness of the envelop gives. The arrangement of the formers or supporters, bent inwardly, as shown and described, and having the curved shoulders, affords additional means for centralizing the V-shaped extension H, permitting and compelling a balance between the complementary shoulders of the formers through the medium of said V-shaped extension. The parts thus constructed and assembled will maintain a balance each with the others at all times, and the connected series of formers or supporters sustained at regulated distances apart will secure an equilibrium of peripheral resiliency impossible in the pneumatic tire. In the employment of this wheel, also, it is noticeable that the wedge-shaped structure H not only affords a resistance to puncturing, but, by reason of its resting on the shoulders of the former, the tendency to compression is constantly resisted by the contractile efforts of the spring-formers.

The tendency in the employment of this tire will be that the wedge-shaped extension will operate to expand the ends of the spring-formers, and the rubber tire or envelop will tend to draw the same together. There will thus be a balance maintained, and the result will to a certain extent simulate the action of a pneumatic tire.

Having thus described my invention, what I claim, and desire to secure by Letters Patent, is—

1. In a hollow tire for bicycles or other vehicles, the combination of a series of spring-formers or supporters constructed and arranged substantially as shown and described and connected to each other by an elastic band and an envelop or cover having a wedge-shaped extension immediately inside and contiguous to the tread and arranged in connection with the spring-former, substantially as and for the purposes set forth.

2. In a hollow tire for bicycles or other vehicles, a series of spring-steel formers or supporters arranged a slight distance one from the other and connected in a series by an elastic band as shown, said formers being divided at points opposite the central point of the tread and having inwardly-curved and wedge-shaped shoulders, with a rubber envelop or cover secured around the formers and having a complementary wedge-shaped portion, all arranged substantially as shown and described.

C. A. HUSSEY.

Witnesses:
M. V. BIDGOOD,
HERBERT KNIGHT.